US010500909B2

(12) United States Patent
Guinart et al.

(10) Patent No.: US 10,500,909 B2
(45) Date of Patent: Dec. 10, 2019

(54) METHOD FOR CONTROLLING A PROCESSOR OF AN ELECTRONIC ENCLOSURE MOUNTED ON A WHEEL OF A MOTOR VEHICLE

(71) Applicants: CONTINENTAL AUTOMOTIVE FRANCE, Toulouse (FR); CONTINENTAL AUTOMOTIVE GmbH, Hannover (DE)

(72) Inventors: Nicolas Guinart, Toulouse (FR); Olivier Fudulea, Toulouse (FR); Jean-Philippe Boisset, Montauban (FR)

(73) Assignees: CONTINENTAL AUTOMOTIVE FRANCE, Toulouse (FR); CONTINENTAL AUTOMOTIVE GMBH, Hannover (DE)

(*) Notice: Subject to any disclaimer, the term of this patent is extended or adjusted under 35 U.S.C. 154(b) by 294 days.

(21) Appl. No.: 15/522,389

(22) PCT Filed: Oct. 22, 2015

(86) PCT No.: PCT/EP2015/002097
§ 371 (c)(1),
(2) Date: Apr. 27, 2017

(87) PCT Pub. No.: WO2016/066254
PCT Pub. Date: May 6, 2016

(65) Prior Publication Data
US 2017/0361666 A1   Dec. 21, 2017

(30) Foreign Application Priority Data

Oct. 30, 2014   (FR) .................................... 14 60439

(51) Int. Cl.
*B60C 23/00*   (2006.01)
*B60C 23/04*   (2006.01)
(Continued)

(52) U.S. Cl.
CPC ...... *B60C 23/0488* (2013.01); *B60C 23/0454* (2013.01); *B60C 23/0459* (2013.01);
(Continued)

(58) Field of Classification Search
None
See application file for complete search history.

(56) References Cited

U.S. PATENT DOCUMENTS 6,960,994 B2 * 11/2005 Tabata ................ B60C 23/0416
116/34 R
7,040,154 B2 *  5/2006 Shaw .................. B60C 23/0408
73/146.3
(Continued)

FOREIGN PATENT DOCUMENTS

DE   10 2008 035 486 A1   3/2009

OTHER PUBLICATIONS

International Search Report, dated Dec. 7, 2015, from corresponding PCT application.

*Primary Examiner* — Jonathan M Dager
(74) *Attorney, Agent, or Firm* — Young & Thompson

(57) ABSTRACT

In a method for controlling a processor on a wheel, wheel operation parameters are calculated and transmitted to a CPU. A first default operating mode (standby mode) is defined, during which activities related to calculating and checking the characteristic data of the tread mark of the tire are deactivated, a second operating mode for detection of significant changes in the value of a characteristic datum of the tread mark, sought during the appearance, in standby mode, of at least one event likely to be preceded by a significant change in the value, and a third operating mode for calculation and transmission, to a CPU, a sequence of values representing the characteristic datum of the footprint, sought during the confirmation, in detection mode, of a significant change in the value of the characteristic datum of (Continued)

the tread mark, and at the end of which a switch is made into monitoring mode.

20 Claims, 2 Drawing Sheets

(51) Int. Cl.
    *B60C 23/06*     (2006.01)
    *G07C 5/08*     (2006.01)
    *B60C 19/00*     (2006.01)

(52) U.S. Cl.
    CPC ........ *B60C 23/0474* (2013.01); *B60C 23/064* (2013.01); *G07C 5/085* (2013.01); *B60C 2019/004* (2013.01)

(56) References Cited

U.S. PATENT DOCUMENTS

| | | | | |
|---|---|---|---|---|
| 7,990,257 | B2* | 8/2011 | Loehndorf | B60C 23/0416 340/442 |
| 8,332,092 | B2* | 12/2012 | Laermer | B60C 23/064 340/443 |
| 8,600,607 | B2* | 12/2013 | Kessler | B60C 23/0488 340/442 |
| 8,606,461 | B2* | 12/2013 | Lammers | B60C 23/008 701/36 |
| 8,607,627 | B2* | 12/2013 | Hilt | B60C 23/041 73/146.5 |
| 9,248,708 | B2* | 2/2016 | Fink | B60C 23/0416 |
| 9,259,979 | B2* | 2/2016 | Juzswik | B60C 23/0416 |
| 9,296,267 | B2* | 3/2016 | McIntyre | B60C 23/0471 |
| 9,322,744 | B2* | 4/2016 | Shima | B60C 23/0416 |
| 9,713,944 | B2* | 7/2017 | Suzuki | B60C 23/064 |
| 9,744,818 | B2* | 8/2017 | Weston | B60C 23/0411 |
| 9,834,045 | B2* | 12/2017 | Freytag | G01M 17/02 |
| 9,849,736 | B2* | 12/2017 | Watanabe | B60C 23/0416 |
| 9,932,022 | B2* | 4/2018 | Weston | B60T 8/1725 |
| 10,017,015 | B2* | 7/2018 | Kautzsch | B60C 23/0416 |
| 10,166,822 | B2* | 1/2019 | Kosugi | B60C 23/0416 |
| 2002/0044050 | A1* | 4/2002 | Derbyshire | B60C 23/0401 340/442 |
| 2004/0090322 | A1* | 5/2004 | Tsujita | B60C 23/0416 340/442 |
| 2004/0201466 | A1* | 10/2004 | Ikeda | B60C 23/0408 340/442 |
| 2005/0075825 | A1* | 4/2005 | Zheng | B60C 23/0488 702/140 |
| 2005/0248446 | A1* | 11/2005 | Watabe | B60C 23/0416 340/442 |
| 2007/0080795 | A1* | 4/2007 | Ichikawa | B60C 23/0413 340/447 |
| 2007/0240501 | A1* | 10/2007 | Mancosu | B60C 23/0408 73/146 |
| 2008/0243327 | A1* | 10/2008 | Bujak | B60W 30/12 701/33.7 |
| 2008/0243334 | A1* | 10/2008 | Bujak | B60G 17/0165 701/37 |
| 2009/0043517 | A1* | 2/2009 | Matsuda | B60W 30/02 702/41 |
| 2009/0302560 | A1* | 12/2009 | Koguchi | B60G 17/015 280/5.521 |
| 2010/0060262 | A1* | 3/2010 | Dulac | G01P 3/48 324/165 |
| 2010/0147061 | A1* | 6/2010 | Weston | B60C 23/0411 73/146 |
| 2010/0231403 | A1* | 9/2010 | Bortolin | B60C 23/0416 340/686.1 |
| 2010/0305809 | A1* | 12/2010 | Audisio | B60C 23/0408 701/31.4 |
| 2011/0113876 | A1* | 5/2011 | Kannnnann | B60C 23/041 73/146.5 |
| 2011/0132649 | A1* | 6/2011 | Weston | B60C 23/0411 174/260 |
| 2012/0029767 | A1* | 2/2012 | Bailie | B60C 23/0416 701/36 |
| 2012/0043856 | A1* | 2/2012 | Kameda | H02N 2/18 310/330 |
| 2012/0112899 | A1* | 5/2012 | Hannon | B60C 23/0416 340/445 |
| 2012/0310475 | A1* | 12/2012 | Fujii | B60C 23/062 701/33.9 |
| 2013/0079977 | A1* | 3/2013 | Greer | G06F 11/30 701/34.4 |
| 2013/0120566 | A1* | 5/2013 | Fujii | G01B 11/25 348/135 |
| 2013/0278406 | A1* | 10/2013 | Weston | B60C 23/0488 340/442 |
| 2014/0070935 | A1* | 3/2014 | Wang | B60W 40/06 340/443 |
| 2014/0076040 | A1* | 3/2014 | Shima | B60C 23/0416 73/146.5 |
| 2014/0085068 | A1* | 3/2014 | Kosugi | B60C 23/0415 340/447 |
| 2014/0150543 | A1* | 6/2014 | Shima | B60C 23/0416 73/146 |
| 2015/0142259 | A1* | 5/2015 | Mori | B60C 23/0416 701/32.7 |
| 2016/0303928 | A1* | 10/2016 | Benbouhout | B60C 23/0408 |
| 2016/0318356 | A1* | 11/2016 | McMillen | B60C 11/243 |
| 2017/0001485 | A1* | 1/2017 | Kessler | B60C 23/0437 |
| 2017/0050478 | A1* | 2/2017 | Ijima | B60C 23/04 |
| 2018/0073855 | A1* | 3/2018 | Raahemifar | G01B 7/24 |

* cited by examiner

METHOD FOR CONTROLLING A PROCESSOR OF AN ELECTRONIC ENCLOSURE MOUNTED ON A WHEEL OF A MOTOR VEHICLE

The invention relates to a method for controlling a processor of an electronic enclosure mounted on a wheel, fitted with a tire, of a motor vehicle, for the purpose of calculating operating parameters of said wheel comprising, notably, one or more pieces of characteristic data of the contact patch of said tire on the ground, and transmitting these data toward a central unit integrated into said motor vehicle.

BACKGROUND OF THE INVENTION

Increasing numbers of motor vehicles are provided, for safety purposes, with detection systems including electronic enclosures mounted on each of the wheels of the vehicle, enclosing sensors used for measuring parameters such as the radial acceleration of the wheel and the pressure and temperature of the tires fitted to these wheels.

In addition to the measurement of the usual parameters intended to provide the driver with direct information on operating parameters of the wheels, it has also been considered useful to provide additional information, including characteristic data of the contact patch of the tire on the ground, which enable the load on each wheel of the vehicle to be estimated, notably by the central unit.

However, the calculation of the values of these characteristic data of the contact patch of the tire, carried out by the processor integrated into each electronic module, has proved to be costly in terms of the calculation time of said processor, and therefore highly energy-intensive.

Consequently, in order to preserve the life of the battery that powers each electronic enclosure, the characteristics of the contact patch of the tires are currently calculated only during the first minutes of running of vehicles after a long stationary period.

This restriction imposed for reasons of energy saving means that it is impossible to detect a large number of situations in which a knowledge of the variation of characteristic data of the contact patch of tires could provide useful information for the operation of the central unit and the control of the parameters processed by this unit.

The present invention is intended to overcome this drawback, and has the primary object of providing a method for controlling a processor of an electronic enclosure which minimizes the effect on energy consumption of the operations of monitoring the variation of the characteristics of the contact patch of the tires, and which enables the useful information relating to this variation to be calculated and transmitted to a central unit, regardless of the running phase.

SUMMARY OF THE INVENTION

For this purpose, the invention proposes a method for controlling a processor of an electronic enclosure mounted on a wheel, fitted with a tire, of a motor vehicle, for the purpose of calculating operating parameters of said wheel, comprising, notably, one or more pieces of characteristic data of the contact patch of said tire on the ground, and transmitting these data toward a central unit integrated into said motor vehicle, and, according to the invention, this control method consists of:

defining three operating modes consisting of:
 a default mode, called the standby mode, in which the activities of the processor relating to the calculation and monitoring of the characteristic data of the tire contact patch are inactivated,
 a mode called the detection mode, in which the processor is programmed to detect a significant change in the value of a piece of characteristic data of the contact patch of the tire,
 a mode called the transmission mode, in which the processor is programmed to calculate a sequence of values representative of the characteristic data of the contact patch, and to cause these values to be transmitted to the central unit, in order to enable the latter to estimate a specific quantity related to the wheel, such as the load applied to said wheel, and the following steps are executed, starting from a configuration of the processor in standby mode:
 step 1: switching to the detection mode on the appearance of at least one predetermined event that may be preceded by a significant variation of the value representative of the characteristic data of the contact patch,
 step 2, calculating, in the detection mode, a value representative of the characteristic data of the contact patch, and comparing this calculated value with a reference value Vref established in a preceding cycle of steps of controlling the processor,
 step 3, (a) switching to the transmission mode if the difference between the calculated value and the reference value Vref exceeds a predetermined threshold, or (b) switching to the standby mode if this difference between the calculated value and the reference value Vref is below said threshold,
 step 4, when a switch is made to the transmission mode in step 3(a), calculating and transmitting, in said transmission mode, a sequence of values representative of the characteristic data of the contact patch,
 step 5, switching from the transmission mode to the standby mode after the transmission of the data sequence.

Thus the invention consists of defining a method based on switching among three operating modes consisting of:
 a standby mode defined so that the energy consumption is monitored, forming a default operating mode:
  in which the procedure switches after each update of the values of the characteristic data of the contact patch, or after an absence of change in these values has been ascertained,
  for which the conditions for exiting said standby mode correspond to events following a situation in which a modification of the characteristic data of the contact patch may have occurred,
 a detection mode, intended purely for the detection of a significant change in the value of a piece of characteristic data of the contact patch,
 and a transmission mode in which an update of the values of the characteristic data of the contact patch is automatically transmitted to the central unit after the detection of a significant change in the value of these data.

This method therefore combines:
high availability, due to the use of the detection mode at the time of any event following a situation in which a variation of the characteristic data of the contact patch may have occurred,
and a minimization of energy consumption, due to the definition of the standby mode and the calling of the transmission mode solely after the detection of a significant change in the value of a piece of characteristic data of the contact patch.

According to an advantageous embodiment of the invention, in step 1 a switch is made from the standby mode to the detection mode on the detection of at least one of the following events:
- the start of movement of the motor vehicle following the halting of the vehicle for a period exceeding a predetermined stopping time,
- the variation of the tire pressure by an absolute value greater than a predetermined threshold, while the vehicle is halted,
- the triggering of the switching by an external command.

By way of example, the first event mentioned above (start of movement) forms an event following a halt (the duration of which may be configurable), in which the vehicle load may have been modified, and therefore forms a determining condition if the characteristic data of the contact patch of the tire are to be used for the calculation of the load applied to the wheel fitted with said tire.

Similarly, the second event (pressure variation) may mean that the driver has adjusted the tire pressures after a modification of the load on the tires.

As for the third event (triggering), this is, notably, intended for applications using the characteristic data of the contact patch of the tire, for the purpose of estimating quantities such as the rate of wear of said tire which are not subject to rapid variation but which should be monitored periodically.

Additionally, if in step 1 the event concerned is the detection of the start of movement of the vehicle, or a variation of the tire pressure, a switch to detection mode is advantageously made, according to the invention, solely if the radial acceleration of the wheel is also above a predetermined threshold.

This additional condition makes it possible, notably, to ensure that the start of movement of the vehicle is not following a stop caused by traffic problems.

According to another advantageous embodiment of the invention, an information signal characteristic of the current step of the processor is caused to be transmitted to the central unit whenever there is a switch to the detection mode, and whenever there is a switch from the detection mode to the transmission mode (step 3a) or standby mode (step 3b).

The purpose of this "demarcation" of the detection mode is to enable the central unit to coordinate the operation of the electronic enclosures mounted on the wheels of the vehicle, notably if there are shifts in operation due to drifts in the times of the clocks of the processors fitted in these electronic enclosures, which may give rise to non-negligible variations in the parameter measurement and transmission periods.

According to another advantageous embodiment of the invention, in step 2 the calculation of a value representative of the characteristic data of the contact patch consists, in the first place, of calculating a sequence of n data, each representative of a value of said characteristic data of the contact patch, and using these n data for the initialization of a digital filter, then using the filtered value of the ((n+1)-th calculated value for the purpose of comparison with the reference value Vref.

This procedure of digital filter initialization makes it possible to ensure perfect uniformity between the reference values and the calculated values in successive configurations in detection mode, and thus enables coherent decisions to be reached.

Furthermore, this initialization procedure is rapid and therefore, notably, consumes little energy, since it enables data acquisition to be carried out with a relatively high frequency, based on a compromise between the desired rapidity of the detection step and the need to acquire a data sequence not subject to the influence of special and temporary driving situations such as cornering or braking.

In order to increase the reactivity of this initialization procedure, notably when there is a significant effective variation in the values of the characteristic data of the contact patch, this initialization of the digital filter is advantageously divided, according to the invention, into at least two successive steps at the end of each of which the filtered value Vf of the next raw value Vb is compared with the reference value Vref in such a way that a switch is made to the transmission mode (step 3a) if the difference between this filtered value Vf and the reference value Vref exceeds a predetermined threshold.

With the same aim, that is to say in order to increase the reactivity of the initialization procedure, the initialization of the digital filter is also advantageously divided, according to the invention, into at least two successive steps at the end of each of which the filtered value Vf of the next raw value Vb is compared with the reference value Vref in such a way that a switch is made to the standby mode (step 3b) if the difference between this filtered value Vf and the reference value Vref is below a predetermined ceiling value.

In this case, the division makes it possible to reduce the time required for the initialization of the digital filter when the values of the characteristic data of the contact patch remain substantially constant between two successive detection modes.

According to another advantageous embodiment of the invention, in step 4 the raw values Vb of the characteristic data of the contact patch are calculated, and said raw values are transmitted to the central unit.

By contrast with the detection procedure, which requires uniformity of the values for the purposes of comparison, the transmission mode requires the transmission to the central unit, for the purposes of processing by this unit, of values that have not been subject to drift due to filtering.

Additionally, in step 4, the filtered value Vf corresponding to each calculated raw value Vb is also advantageously determined.

These filtered values serve notably, and advantageously according to the invention, to determine, in step 2, a reference value Vref consisting of:
- the filtered value Vf of the last raw value Vb calculated during the preceding configuration in detection mode, when said preceding detection mode has been followed by a switch to the standby mode (step 3b),
- the filtered value Vf of the last raw value Vb calculated during the preceding configuration in transmission mode, when said preceding detection mode has been followed by a switch to said transmission mode (step 3a).

However, it should be noted that there is an exception to this principle, regarding the first configuration in detection mode, for which the reference value Vref is advantageously chosen to be equal to zero.

The filtered values Vf in step 4 are also used, advantageously according to the invention, for the calculation of a parameter which is a function of the difference between each raw value Vb(t) and the filtered value Vf(t−1) of the preceding raw value Vb(t−1), and which is assigned to said raw value Vb(t) as a parameter for the assessment of the quality of this raw value.

These parameters enable the central unit to assess the actual relevance of the received data, and notably, by analogy with other data also supplied to said central unit, to provide evidence for the low quality assigned to a piece of data, and to use said piece of data for other purposes if appropriate.

As a general rule, however, the data primarily used by the central unit are data to which a parameter providing evidence of their good quality has been assigned, and, advantageously according to the invention, in step 5, a switch is made from the transmission mode to the standby mode after the transmission of a predetermined number $Nt_{max}(Q_{opt})$ of raw values Vb associated with a parameter $Q_{opt}$ representative of a good quality of said value.

In this step 5, and advantageously according to the invention, the number of values representative of the characteristic data of the contact patch transmitted in transmission mode is also limited to a predetermined number $Nt_{max}$ of transmissions, in order to switch to the standby mode after the transmission of this predetermined number $Nt_{max}$ of values.

This interruption of the transmission mode after a given number $Nt_{max}$ of transmissions is intended to prevent any looping operation due to a malfunction.

On the other hand, if this interruption is a manifestation of large drifts in the calculated values, in the next step 2, the reference value Vref then consists, advantageously according to the invention, in the filtered value Vf of the last raw value Vb calculated during the preceding configuration in detection mode.

Additionally, on each switch from the transmission mode to the standby mode, an information signal is advantageously caused to be transmitted, according to the invention, to the central unit, specifying the event, namely a number of transmissions $Nt_{max}$ reached, or a number of transmissions $Nt(Q_{opt})$ reached, responsible for said switch.

According to another advantageous embodiment of the invention, in step 4 each filtered value Vf is compared with a reference value Vref consisting of the filtered value Vf of the last raw value Vb calculated in the preceding detection mode, and in step 6 a switch is made to the detection mode if the difference between the filtered value Vf and said reference value Vref exceeds a predetermined threshold.

This arrangement makes it possible to detect a significant variation in the characteristic data of the contact patch which occurs during the transmission mode, and then results in the interruption of this transmission mode so that the digital filter can then be reinitialized.

It should also be noted that this operation, which is manifested by a switch to the detection mode, results, as mentioned above, in the transmission of an information signal to the central unit so that the latter is informed of the reason for the interruption of the transmission of the sequence of values representative of the characteristic data of the contact patch.

BRIEF DESCRIPTION OF THE DRAWINGS

Other characteristics, objects and advantages of the invention will be apparent from the following detailed description, referring to the attached drawings, which represent a preferred embodiment of the invention by way of non-limiting example. In these drawings.

DETAILED DESCRIPTION OF THE PREFERRED EMBODIMENTS

The method according to the invention is intended to provide a function of controlling a processor of an electronic enclosure mounted on a wheel, fitted with a tire, of a motor vehicle, for the purpose of calculating characteristic data of the contact patch of said tire on the ground, and transmitting these data toward a central unit integrated into said motor vehicle.

Figure 1:
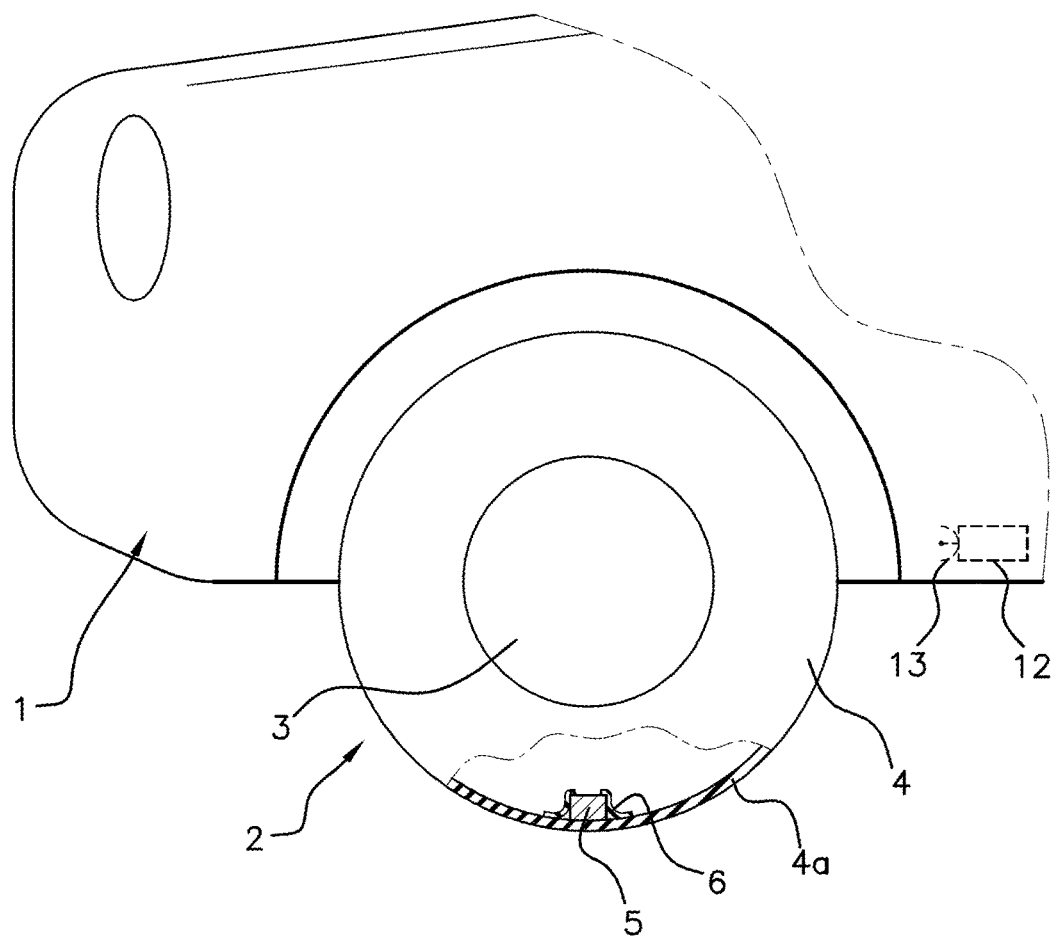
FIG. 1 is a schematic view of the front part of a motor vehicle equipped with an electronic enclosure for the execution of the method according to the invention for controlling the processor of this electronic enclosure.

For the execution of this method, as shown in FIG. 1, the vehicle 1 comprises wheels such as the wheel 2, composed in a conventional way of a rim 3 fitted with a tire 4, and a monitoring system for monitoring parameters such as the pressure and temperature of each of said tires and the radial acceleration of said wheel, comprising, firstly, an electronic enclosure 5 associated with each wheel 2.

Figure 2:
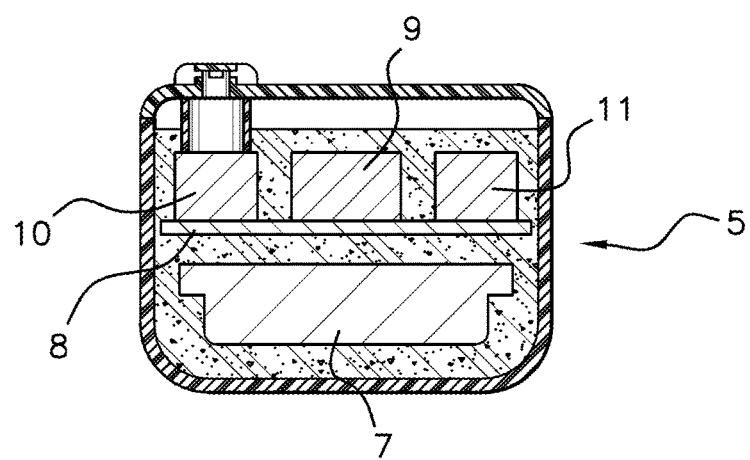
FIG. 2 is a sectional view, on an enlarged scale, of an electronic enclosure for the execution of the method according to the invention.

According to the example shown in FIGS. 1 and 2, this electronic enclosure 5 is positioned on the inner face of the tread 4a of the tire 4. In order to secure the enclosure, it is inserted into a flexible receptacle 6 bonded to the tread 4a and made of a plastic material adapted to form a "pouch" having a retentive shape in which the electronic enclosure 5 is trapped.

Additionally, as shown in FIG. 2, each electronic enclosure 5 incorporates, notably, the following elements embedded in a filling material: a battery 7 housed in the bottom of said enclosure, and, above this battery 7, an electronic circuit card 8 to which are connected:

a processor 9 linked to a radiofrequency (RF) transmitter connected to an antenna, a pressure sensor 10 having a measurement chamber, and a sensor 11 for measuring the radial acceleration of the wheel 2, in the form of an electronic microsystem, a piezoelectric sensor, an impact sensor, or other device.

The monitoring system also comprises a centralized computer or central unit 12 installed in the vehicle 1, comprising a processor and incorporating a radiofrequency (RF) receiver linked to an antenna 13 for receiving the signals transmitted by the electronic enclosures 5.

An example of the execution of the method according to the invention for controlling the processor 9 integrated into the electronic enclosure 5 mounted on the wheel 2 of the motor vehicle 1 is described below in the context of an application intended to supply, to the central unit 12, data representative of the length on the ground of the contact patch of the tire 4 fitted to this wheel 2, thereby enabling said central unit, to estimate the load applied to said wheel.

Figure 3:
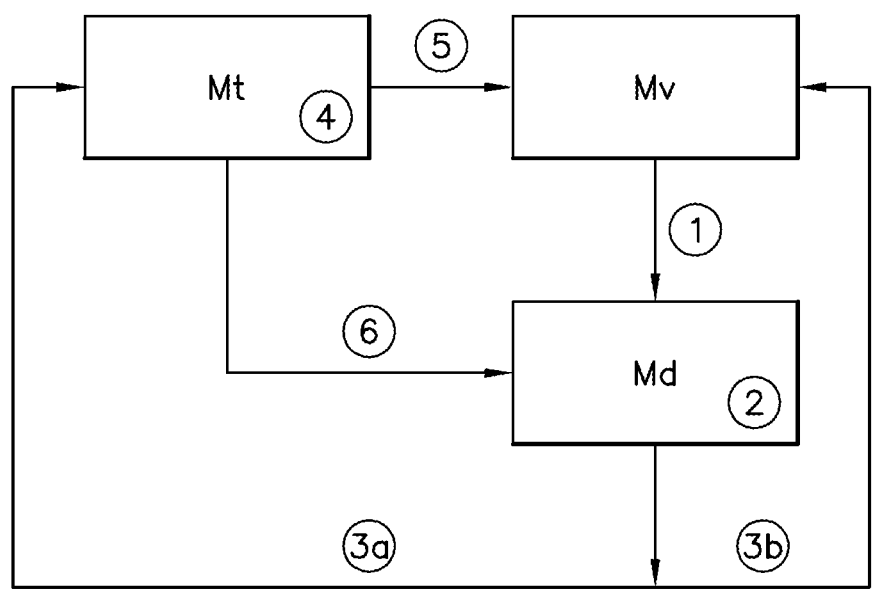
FIG. 3 is a synoptic diagram illustrating the method according to the invention.

This control method consists, firstly, in defining three operating modes (FIG. 3):

a default mode consisting of a standby mode Mv, in which:

the activities of the processor 9 relating to the calculation and monitoring of the data representative of the length of the contact patch of the tire 4 on the ground are inactivated, the processor 9 causes the acquisition of the data sent from the sensors such as the pressure sensor 10 and the radial acceleration measurement sensor 11, for the purpose of detecting at least one predetermined event that may be preceded by a significant variation in the value of the length of the contact patch, a mode called the detection mode Md, in which the processor 9 is programmed to detect a significant change in the value of the length of the contact patch and, for this purpose, to calculate a value representative of this length and to compare this calculated value with a reference value Vref, and a mode called the transmission mode Mt, in which the processor 9 is programmed to calculate a sequence of values representative of the length of the contact patch, and to cause these values to be transmitted to the central unit 12, in order to enable the latter to estimate the load applied to the wheel 2.

On the basis of these three operating modes, the different steps of the control method are described below, on the assumption that the vehicle 1 is initially in a stationary condition, corresponding to the operation of the processor 9 in standby mode Mv.

Firstly, switching from this standby mode Mv to the detection mode Md (step 1) is dependent on the following two conditions being met together:

detection of at least one of the following two events:
either the start of movement of the motor vehicle 1 following the halting of the vehicle for a period exceeding a predetermined stopping time, of 1 to 5 minutes for example, which may allow the load carried to be changed,
or a variation of the pressure of the tire 4 by an absolute value greater than a predetermined threshold, of about 30 kPa for example, while the vehicle 1 is halted,
and the measurement of a radial acceleration of the wheel 2 exceeding a predetermined threshold which is, for example, representative of a speed of the vehicle 1 greater than 40 km/h.

The first operation performed in the detection mode Md is that of causing an information signal to be transmitted to the central unit 12, for the purpose, notably, of allowing said central unit to coordinate the operation of the electronic enclosures 5 mounted on the various wheels 2 of the vehicle 1.

The following operations, performed in this detection mode Md (step 2), consist of:

initializing a digital filter by calculating a sequence of n raw values Vb representative of successive values of the length of the contact patch, and using these n values for the purpose of initializing the digital filter,
using the digital filter to determine a filtered value Vf of the length of the contact patch, which is to be compared with a reference value Vref.

The digital filter initialization procedure is also divided into at least two successive steps, for example three successive steps, in each of which a fraction n1, n2, n3 respectively, where n1+n2+n3=n, of the n estimated values required to perform said initialization is measured, and, at the end of each step, a (ni+1)-th raw value Vb is calculated, where i=1 to 3,
the filtered value Vf of this (ni+1)-th raw value Vb is compared with the reference value Vref.

Additionally, at the end of each of the intermediate steps of this initialization procedure (that is to say, after (n1+1) calculations and (n1+n2+1) calculations), then (step 3a) either a switch is made to the transmission mode Mt if the difference between the filtered value Vf and the reference value Vref exceeds a predetermined threshold, or said initialization procedure is continued.

Finally, at the end of the last step of the initialization procedure, if this last step is reached, then either a switch is made (step 3a) to the transmission mode Mt if the difference between the filtered value Vf and the reference value Vref exceeds a predetermined threshold, or (step 3b), if this difference between the filtered value Vf and the reference value Vref remains below the threshold, a switch is made to the standby mode Mv.

Additionally, the threshold has a value which is decreased in each initialization step by comparison with the preceding one, so that said successive initialization steps are less and less selective, to allow for the increasing number of calculated values taken into account and the consequent improvement of uniformity.

Furthermore, at the end of each intermediate step of the initialization procedure, the comparison of the filtered value Vf of the (ni+1)-th raw value Vb with the reference value Vref is also used to cause a switch to be made to the standby mode (step 3b) if the difference between this filtered value Vf and the reference value Vref is below a predetermined ceiling value.

Because of this arrangement, it is possible to reduce the time required for the initialization of the digital filter when the calculated values of the length of the contact patch remain substantially constant between two successive detection modes.

Moreover, the value of the ceiling increases in each step compared with the preceding one.

This procedure of digital filter initialization makes it possible to ensure perfect uniformity between the reference values and the calculated values. Furthermore, this procedure consumes little energy, since it requires a smaller number of calculated values, each requiring data acquisitions which may be performed with a relatively high frequency, due to a compromise between the desired rapidity of the detection step and the need to acquire a data sequence not subject to the influence of special and temporary driving situations such as cornering or braking.

By way of example, a complete initialization procedure requires only the calculation of 16 filtered values Vf, with an acquisition period, and therefore a calculation period, of 4 seconds.

Also by way of example, the value of the threshold during the final step of the initialization procedure is 0.2%.

As regards the value of the ceiling during the first step of the initialization procedure, this is, by way of example, equal to 0.05%.

The last operation performed in the detection mode Md is that of causing an end-of-mode information signal to be transmitted to the central unit 12.

At the end of step 2, therefore, the control method according to the invention leads to either (step 3a) a switch to the transmission mode Mt if a significant change is detected in the filtered value Vf representative of the length of the contact patch, or (step 3b) a switch to the standby mode My in the absence of a significant change in this filtered value Vf.

As mentioned above, if a switch is made to the transmission mode Mt in step 3(a), then step 4, which is executed in said transmission mode, has the purpose of calculating a sequence of values representative of the length of the contact patch and transmitting this sequence to the central unit 12.

For this purpose, the calculation and transmission of each value consists, at given instants t, of:
calculating the raw value Vb(t) representative of the length of the contact patch, and determining the filtered value Vf(t) corresponding to this raw value Vb(t), calculating a parameter which is a function of the difference between each raw value Vb(t) and the filtered value Vf(t−1) of the raw value Vb(t−1) calculated at the preceding instant (t−1), transmitting to the central unit 12, for example with a periodicity of 16 s to meet electronic pollution standards, the raw value Vb(t) with an assigned parameter which is a function of Vb(t)−Vf(t−1), and which forms a parameter for assessing the quality of this raw value Vb(t).

It should be noted that, regarding the first raw value 4, the filtered value taken into account for the calculation of the quality assessment parameter of this value consists in the filtered value Vf of the last raw value Vb calculated in the preceding detection mode Md.

Additionally, in this step 4 which is executed in the transmission mode Mt, each filtered value Vf(t) is compared with a reference value Vref consisting of the filtered value Vf of the last raw value Vb calculated in the preceding detection mode, and:

if the difference between the filtered value Vf and the reference value Vref exceeds a predetermined threshold which, for example, has a value identical to that of the threshold used for step 2, a switch is made in step 6 to the detection mode Md, if the difference between the filtered value Vf and the reference value Vref is below the threshold, this step 4 of the transmission mode is continued.

This comparison operation makes it possible to detect any significant variation in the value of the filtered values, and, in this case, results in an interruption of the transmission procedure and a reinitialization of the digital filter in the detection mode Md (step 2).

It should also be noted that switch to the detection mode Md is accompanied, as described above, by the transmission of an information signal to the central unit 12 so that the latter is informed of the reason for the interruption of the transmission.

Additionally, this comparison between filtered values Vf and the reference value Vref ensures the relevance of the filtered value Vf(t−1) used for the calculation of the quality assessment parameter of each raw value Vb(t).

The transmission mode Mt therefore results in the transmission to the central unit 12 of a sequence of raw values Vb representative of the length of the contact patch of the tire 4 on the ground, each value being assigned a parameter designed to enable said central unit to assess the quality of each of these raw values.

This transmission mode Mt also continues until the transmission of:

either a predetermined number $Nt_{max}(Q_{opt})$, equal to 10 for example, of raw values Vb associated with a parameter $Q_{opt}$ representative of a good quality of said value, or a predetermined number $Nt_{max}$ of transmissions, equal to 20 for example.

Additionally, an information signal is sent to the central unit 12, specifying the event, namely a number of transmissions $Nt_{max}$ reached, or a number of transmissions Nt ($Q_{opt}$) reached, responsible for said switch.

Finally, when one of these two numbers $Nt_{max}(Q_{opt})$ or $Nt_{max}$ has been reached, the control procedure cycle ends with a switch to the standby mode Mv which continues until the appearance and detection of events that may be preceded by a significant change in the contact patch length.

Finally, the reference value Vref used in the execution of step 2, in the detection mode Md, is as follows:

in the first cycle of the control procedure, Vref=0, if the preceding detection mode Md has been followed by a switch to the standby mode Mv (step 3b), Vref=the filtered value Vf of the last raw value Vb calculated during said preceding detection mode, if the preceding detection mode Md has been followed by a switch to the transmission mode Mt (step 3a), Vref=the filtered value Vf of the last raw value Vb calculated during said transmission mode, unless, at the end of this transmission mode Mt, the switch to the standby mode Mv was triggered after a maximum number Ntmax of transmissions. In this case, Vref=the filtered value Vf of the last raw value Vb calculated during the preceding configuration in detection mode Md.

Additionally, as mentioned above, the reference value Vref used during the execution of step 4 in the transmission mode Mt consists, for its part, of the filtered value Vf of the last raw value Vb calculated in the preceding detection mode Md.

The control method according to the invention described above combines:

high availability, due to the use of the detection mode Md at the time of any event following a situation in which a variation of the length of the contact patch may have occurred, with a minimization of energy consumption, due to the definition of the default standby mode consisting of the standby mode Mv and the calling of the transmission mode Mt solely after the detection of a significant change in the length of the contact patch.

The invention claimed is:

1. A method of controlling a processor (9) of an electronic enclosure (5) configured to be mounted on a wheel (2), fitted with a tire (4), of a motor vehicle (1), for calculating operating parameters of said wheel that include characteristic data of a contact patch of said tire with the ground, and for transmitting said characteristic data toward a central unit (12) integrated into said motor vehicle, said control method comprising:

three operating modes comprised of:

a default standby mode (Mv), in which activities of the processor (9) relating to calculating and monitoring of the characteristic data of the contact patch are inactivated, a detection mode (Md) in which the processor (9) operates to detect a significant change in a value of a piece of the characteristic data of the contact patch, and a transmission mode (Mt) in which the processor (9) operates to calculate a sequence of values representative of the characteristic data of the contact patch, and to cause the values to be transmitted to the central unit (12), in order to enable the central unit to estimate a specific quantity related to the wheel (2);

and the following steps are executed, starting from a configuration of the processor operating in the default standby mode (Mv):

step 1: switching from the default standby mode (Mv) to the detection mode (Md) on occurrence of at least one predetermined event that may be preceded by a significant variation of a value representative of the characteristic data of the contact patch;

step 2: calculating, in the detection mode (Md), a calculated value representative of the characteristic data of the contact patch, and comparing said calculated value with a reference value (Vref);

step 3: (a) switching to the transmission mode (Mt) if a difference between the calculated value and the reference value (Vref) exceeds a first predetermined threshold, and (b) switching to the standby mode (Mv) if the difference between the calculated value and the reference value (Vref) is below said first threshold;

step 4: when switching to the transmission mode (Mt) in accordance with step 3(a), calculating and transmitting, in said transmission mode (Mt), the sequence of values representative of the characteristic data of the contact patch; and step 5: switching from the transmission mode (Mt) to the standby mode (Mv) after the transmitting of the sequence of values representative of the characteristic data of the contact patch.

2. The control method as claimed in claim 1, wherein in step 1, said switching to the detection mode (Md) occurs on detection of at least one of the following events:

a start of movement of the motor vehicle (1) following a halting of the vehicle for a period exceeding a predetermined stopping time, a variation of a pressure of the tire (4) by an absolute value greater than a second predetermined threshold, while the vehicle (1) is halted, a triggering of the switching by an external command.

3. The control method as claimed in claim 2, wherein in step 1, on detection of either a start of movement of the vehicle (1), or a variation of a pressure of the tire (4), switching a switch to the detection mode is made solely on condition that a radial acceleration of the wheel (2) is above a third predetermined threshold.

4. The control method as claimed in claim 1, wherein an information signal characteristic of a current step of the processor (9) is caused to be transmitted to the central unit (12) whenever switching occurs to the detection mode, and whenever switching occurs from the detection mode to the transmission mode (step 3a) or to the standby mode (step 3b).

5. The control method as claimed in claim 1, wherein in step 2, the calculation of the calculated value representative of the characteristic data of the contact patch includes calculating a sequence of n data that are each representative of a raw value (Vb) of said characteristic data of the contact patch, using these n data for initializing a digital filter, then using a filtered value (Vf) of an (n+1)-th raw value (Vb) for the comparing with the reference value (Vref).

6. The control method as claimed in claim 5, wherein the initializing the digital filter is divided into at least two successive steps, at the end of each of which the filtered value (Vf) of the next raw value (Vb) is compared with the reference value (Vref) in such a way that switching occurs to the transmission mode (step 3a) if the difference between this filtered value (Vf) and the reference value (Vref) exceeds a fourth predetermined threshold.

7. The control method as claimed in claim 5, wherein the initializing the digital filter is divided into at least two successive steps, at the end of each of which the filtered value (Vf) of the next raw value (Vb) is compared with the reference value (Vref) in such a way that switching occurs to the standby mode (step 3b) if the difference between this filtered value (Vf) and the reference value (Vref) is below a predetermined ceiling value.

8. The control method as claimed in claim 1, wherein, in step 4, raw values (Vb) of the characteristic data of the contact patch are calculated, and said raw values are transmitted to the central unit (12).

9. The control method as claimed in claim 5, wherein in step 4, the filtered value (Vf) corresponding to each calculated raw value (Vb) is also determined.

10. The control method as claimed in claim 5, wherein, in step 2, the reference value (Vref) is comprised of:

a filtered value (Vf) of a last raw value (Vb) calculated during a first preceding configuration in the detection mode when said first preceding detection mode has been followed by switching to the standby mode (step 3b), and a filtered value (Vf) of a last raw value (Vb) calculated during a second preceding configuration in transmission mode when said second preceding detection mode has been followed by switching to said transmission mode (step 3a).

11. The control method as claimed in claim 9, wherein in step 4, a parameter which is a function of a difference between each raw value (Vb(t)) and a filtered value (Vf(t−1)) of a preceding raw value (Vb(t−1)) is calculated, said parameter being assigned to said each raw value (Vb(t)) as a parameter for the assessment of the quality of said each raw value.

12. The control method as claimed in claim 11, wherein in step 5, said switching from the transmission mode to the standby mode takes place after transmission of a predetermined number ($Nt_{max}(Q_{opt})$) of raw values (Vb) associated with a parameter ($Q_{opt}$) representative of a good quality of said raw values.

13. The control method as claimed in claim 10, wherein in step 5, a number of the values representative of the characteristic data of the contact patch transmitted in the transmission mode is limited to a predetermined number ($Nt_{max}$) of transmissions, and wherein switching takes place to the standby mode after transmission of the predetermined number ($Nt_{max}$) of said values.

14. The control method as claimed in claim 13, wherein after switching to the standby mode resulting from the predetermined number ($Nt_{max}$) of transmissions, in a next step 2, the reference value (Vref) is comprised of a filtered value (Vf) of the last raw value (Vb) calculated during a preceding configuration in the detection mode.

15. The control method as claimed in claim 12, wherein in step 5, a number of values representative of the characteristic data of the contact patch transmitted in the transmission mode is limited to a predetermined number ($Nt_{max}$) of transmissions, and wherein switching is made to the standby mode after the transmission of the predetermined number ($Nt_{max}$) of values, and wherein on each switching from the transmission mode to the standby mode, an information signal is caused to be transmitted to the central unit (12), specifying a number of transmissions responsible for said switching.

16. The control method as claimed in claim 9, wherein:

in step 4, each filtered value (Vf) is compared with the reference value (Vref) comprised of the filtered value (Vf) of a last raw value (Vb) calculated in a preceding detection mode, and in step 6, switching occurs to the detection mode if the difference between the filtered value (Vf) and the reference value (Vref) exceeds a fifth predetermined threshold.

17. The method of claim 1, wherein the specific quantity related to the wheel is a load applied to the wheel.

18. The control method as claimed in claim 2, wherein an information signal characteristic of a current step of the processor (9) is caused to be transmitted to the central unit (12) whenever switching occurs to the detection mode, and whenever switching occurs from the detection mode to the transmission mode (step 3a) or to the standby mode (step 3b).

19. The control method as claimed in claim 3, wherein an information signal characteristic of a current step of the processor (9) is caused to be transmitted to the central unit (12) whenever switching occurs to the detection mode, and whenever switching occurs from the detection mode to the transmission mode (step 3a) or to the standby mode (step 3b).

20. The control method as claimed in claim 2, wherein in step 2, the calculation of the calculated value representative of the characteristic data of the contact patch includes calculating a sequence of n data that are each representative of a raw value (Vb) of said characteristic data of the contact patch, using these n data for initializing a digital filter, then using a filtered value (Vf) of an (n+1)-th raw value (Vb) for the comparing with the reference value (Vref).

\* \* \* \* \*